(12) United States Patent
Sundström et al.

(10) Patent No.: US 9,391,667 B2
(45) Date of Patent: Jul. 12, 2016

(54) CANCELLATION OF SPURIOUS RESPONSES FROM LOCAL OSCILLATOR CROSS-COUPLING

(71) Applicant: Telefonaktiebolaget L M Ericsson (publ), Stockholm (SE)

(72) Inventors: Lars Sundström, Södra Sandby (SE); Fenghao Mu, Hjärup (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 234 days.

(21) Appl. No.: 13/935,728

(22) Filed: Jul. 5, 2013

(65) Prior Publication Data

US 2015/0009866 A1  Jan. 8, 2015

(51) Int. Cl.
  *H04B 1/50*  (2006.01)
  *H04B 7/26*  (2006.01)
  *H04B 1/525*  (2015.01)

(52) U.S. Cl.
  CPC .................. *H04B 1/50* (2013.01); *H04B 1/525* (2013.01); *H04B 7/2621* (2013.01)

(58) Field of Classification Search
  None
  See application file for complete search history.

(56) References Cited

U.S. PATENT DOCUMENTS

| 2004/0048576 | A1* | 3/2004 | Hildebrand et al. ......... 455/67.3 |
| 2004/0117861 | A1 | 6/2004 | Dessert et al. |
| 2007/0184782 | A1 | 8/2007 | Sahota et al. |
| 2009/0068974 | A1 | 3/2009 | Smith |
| 2009/0086863 | A1* | 4/2009 | Komninakis et al. ......... 375/346 |
| 2010/0214145 | A1 | 8/2010 | Narasimhan et al. |
| 2010/0227570 | A1* | 9/2010 | Hendin ........................... 455/78 |
| 2010/0296568 | A1 | 11/2010 | Bury |
| 2011/0070858 | A1 | 3/2011 | He et al. |

(Continued)

FOREIGN PATENT DOCUMENTS

| EP | 1248395 A2 | 4/2002 |
| WO | 2013079389 A1 | 6/2013 |

OTHER PUBLICATIONS

Braithwaite, N.R. et al. "Adaptive Echo Cancellation for an On-Frequency RF Repeater using a Weighted Power Spectrum." 2007 European Conference on Wireless Technologies, Oct. 8-10, 1997, pp. 82-85, Munich, Germany.

(Continued)

*Primary Examiner* — Charles C Jiang
*Assistant Examiner* — George Atkins, Jr.
(74) *Attorney, Agent, or Firm* — Murphy, Bilak & Homiller, PLLC (57) ABSTRACT

Interference cancellation techniques may be implemented in a radio transceiver configured to transmit a radio-frequency transmit signal at a transmit frequency and having two or more local oscillators operative to simultaneously generate local oscillator signals, at corresponding local oscillator frequencies, for simultaneously down-converting two or more corresponding received radio-frequency signals. An example method begins with identifying one or more self-interfering frequencies, based on the local oscillator frequencies and the transmit frequency. A baseband cancellation signal is then generated by weighting and frequency-shifting a baseband representation of the transmit signal, based on the identified self-interfering frequencies. The baseband cancellation signal is then combined with a down-converted received signal, to obtain an interference-reduced baseband signal.

18 Claims, 8 Drawing Sheets

(56) References Cited

U.S. PATENT DOCUMENTS

| | | |
|---|---|---|
| 2011/0195672 A1 | 8/2011 | Pratt et al. |
| 2012/0040628 A1 | 2/2012 | Krug et al. |
| 2012/0140860 A1 | 6/2012 | Rimini et al. |
| 2012/0295558 A1 | 11/2012 | Wang et al. |
| 2013/0044791 A1* | 2/2013 | Rimini et al. ............. 375/219 |

OTHER PUBLICATIONS

Grant, S.J. et al. "A DSP Controlled Adaptive Feedforward Amplifier Linearizer." 1996 5th IEEE International Conference on Universal Personal Communicatons, Sep. 29-Oct. 2, 1996, pp. 788-792, vol. 2, Cambridge, MA, USA.

Jeruchim, M.C. et al. "Estimation of Performance Measures from Simulation." Simulation of Communication Systems: Modeling, Methodology and Techniques, Oct. 31, 2000, pp. 669-683, Section 11.1, 2nd Edition, Springer.

Knapp, C.H. et al. "The Generalized Correlation Method for Estimation of Time Delay." IEEE Transactions on Acoustics, Speech and Signal Processing, Aug. 1976, pp. 320-327, vol. 24, Issue No. 4.

Liu, T. et al. "Accurate Time-Delay Estimation and Alignment for RF Power Amplifier/Transmitter Characterization." 4th IEEE International Conference on Circuits and Systems for Communications, May 26-28, 2008, pp. 70-74, Shanghai, China.

Grant, S.J. "A DSP Controlled Adaptive Feedforward Amplifier Linearizer." Thesis, Jul. 1996, pp. 1-104, Simon Fraser University, Burnaby, British Columbia, Canada.

* cited by examiner

```
Calculate spurious frequencies f_{s1}, f_{s2}, f_{s3}, ...

for each RX carrier C_{RXk} at frequency f_{RXk} with bandwidth BW_{TXk} for each spurious frequency f_{sn} for each TX carrier C_{TXj} at frequency f_{TXj} with bandwidth BW_{TXj} if the frequency range of C_{TXj} [f_{TXj}-BW_{TXj}/2, f_{TXj}+BW_{TXj}/2)] intersects
            with the victim frequency range [f_{sn}-BW_{RXj}/2, f_{sn}+BW_{RXj}/2)] and the power
            P_{TXi} of C_{TXj} is above a threshold level TH_{TXi}, mark C_{TXj} for cancellation from C_{RXk} at baseband endif endfor endfor endfor
```

CANCELLATION OF SPURIOUS RESPONSES FROM LOCAL OSCILLATOR CROSS-COUPLING

BACKGROUND

For single-carrier Frequency-Division Duplexing (FDD) systems like the High-Speed Packet Access (HSPA) FDD and Long-Term Evolution (LTE) FDD systems developed by the $3^{rd}$-Generation Partnership Project (3GPP), a major challenge to radio transceiver designers is the leakage of transmit (TX) signals into the receiver inputs, since the transmitters and receivers in FDD systems are (by definition) simultaneously active. This leakage primarily occurs due to the limited attenuation of duplex filters in the radio transceiver.

The leakage of the TX signal into the receiver may be viewed as containing two distinct parts, each of which can affect the receiver performance. First, the leakage includes TX noise, at frequencies extending far from the intended bandwidth of the TX signal, which can extend into the frequency range used by the signals to be received. This TX noise directly leads to co-channel interference. Second, the leakage includes an attenuated version of the actual modulated TX signal, which leads to a strong signal at the receiver input, albeit at a frequency different from the desired receiver signal. The receiver must be able to accommodate this out-of-band signal without becoming saturated.

Leakage problems become more complex in transceivers designed to support carrier aggregation, in which the transceiver supports the simultaneous use of two or more uplink and/or downlink carriers. Such transceivers can have two or more local oscillators, at different frequencies, operating simultaneously. The signals from these local oscillators can interact with one another, generating nonlinear intermodulation products that can create spurious frequency components in LO signals. This is particularly harmful for the receivers, in which the spurious frequency components of the LO may lead to undesired frequency-conversion of the leaked transmitter signals that will interfere with the desired signals to be received.

While various techniques have been proposed for combatting transmitter leakage in simple transceiver designs, improved techniques are needed to address the problems created in transceivers that include two or more simultaneously operating receivers.

SUMMARY

According to the techniques detailed below, the LO spurious frequencies arising from LO coupling and nonlinear operations on the LO signals are calculated. Together with the frequencies of the TX signals, it is determined whether the TX signal will lead to co-channel interference or not. If so, a baseband representation of the TX signal is properly shifted in frequency, time aligned, and weighted and subtracted from the received signal to substantially lower its impact on the received signals.

An example method according to these techniques may be implemented in a radio transceiver configured to transmit a radio-frequency transmit signal at a transmit frequency and having two or more local oscillators operative to simultaneously generate local oscillator signals, at corresponding local oscillator frequencies, for simultaneously down-converting two or more corresponding received radio-frequency signals. The method begins with identifying one or more self-interfering frequencies, based on the local oscillator frequencies and the transmit frequency. A baseband cancellation signal is then generated, by weighting and frequency-shifting a baseband representation of the transmit signal, based on the identified self-interfering frequencies. The baseband cancellation signal is then combined with a down-converted received signal, to obtain an interference-reduced baseband signal.

Other embodiments of the disclosed techniques include radio transceivers adapted to carry out the method summarized above, or variants thereof. An example radio transceiver includes a transmitter circuit configured to transmit a radio-frequency transmit signal at a transmit frequency, two or more local oscillators configured to simultaneously generate local oscillator signals, at corresponding local oscillator frequencies, and a receiver circuit configured to simultaneously down-convert two or more received radio-frequency signals, using corresponding ones of the two or more local oscillators. The radio transceiver further comprises a baseband processing circuit configured to identify one or more self-interfering frequencies, based on the local oscillator frequencies and the transmit frequency, generate a baseband cancellation signal by weighting and frequency-shifting a baseband representation of the transmit signal, and combine the baseband cancellation signal with a down-converted received signal, to obtain an interference-reduced baseband signal.

Still other embodiments include wireless devices, such as wireless handsets, that include radio transceivers like those summarized above. Of course, the techniques, systems, and apparatus described herein are not limited to the above features and advantages. Indeed, those skilled in the art will recognize additional features and advantages upon reading the following detailed description, and upon viewing the accompanying drawings.

DETAILED DESCRIPTION

In the discussion that follows, specific details of particular embodiments of the present invention are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the present invention may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Figure 1:
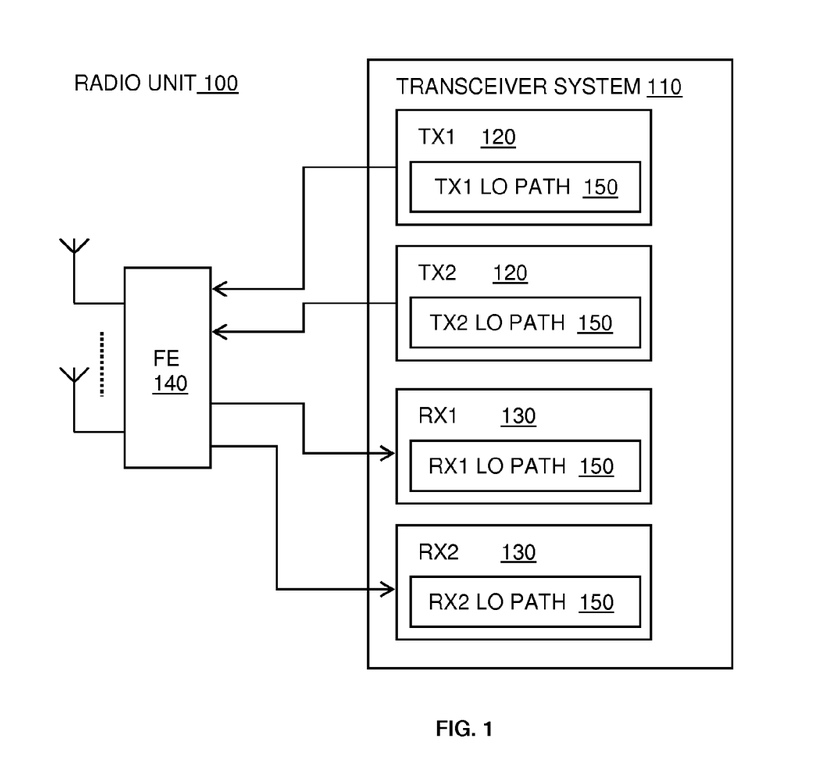
FIG. 1 illustrates an example radio unit.

FIG. 1 illustrates a radio unit 100, which includes a a transceiver system 110 having two transmitters 120 and two receivers 130, all of which may be co-located on the same chip in some instances. The transmitter outputs and the receiver inputs are connected to an RF front-end unit 140, which may contain duplex filters and transmit/receive switches, antenna tuners, etc., as typically found in wireless radio modems for cellular handsets and the like.

For the examples to be described below, it is generally assumed that the up-conversion frequency for transmitter 1 (TX1) is different from that of transmitter 2 (TX2). Furthermore, it is assumed that the down-conversion frequency for receiver 1 (RX1) is different from that of receiver 2 (RX2). One example of a scenario where such a configuration might arise is in a cellular handset that supports LTE intra-band carrier aggregation, i.e., where two or more receivers are used to receive signals in different channels but within the same 3GPP downlink (DL) band, and where one transmitter is used to transmit a signal within one of the corresponding channels of the same 3GPP uplink (UL) band. Optionally, two or more transmitters may be used transmit signals in different channels but also within the same band.

Figure 2:
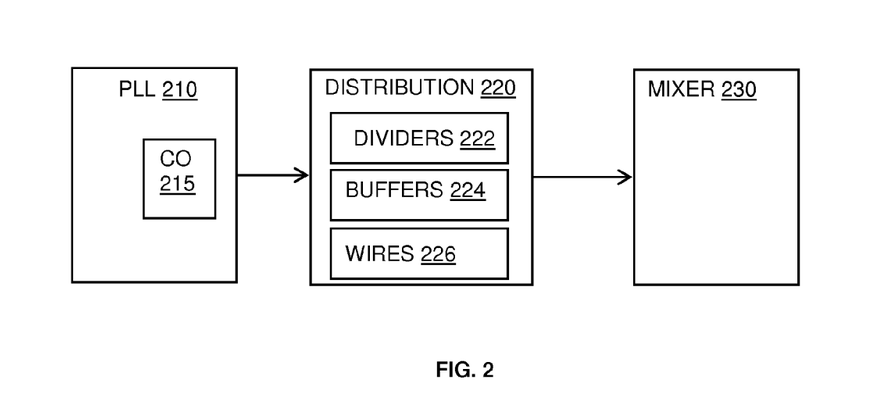
FIG. 2 shows details of an example local oscillator (LO) path.

Associated with each transmitter and each receiver there is a local oscillator (LO) path 150. Details of an example LO path are shown in FIG. 2, where the illustrated LO path contains a radio-frequency (RF) synthesizer, typically in the form of a phase-locked loop (PLL) circuit 210, a distribution circuit 220 containing buffers 224 and wires 226 and possibly also frequency dividers 222, and, finally, a mixer 230 being driven by the LO signal provided by the distribution circuitry 220.

PLL circuit 210 contains a controlled oscillator (CO) 215, which is typically an LC-based oscillator to achieve good phase-noise performance. The coil or other inductive element (L) used in the CO is prone to coupling with other inductive circuit elements in the vicinity. Long wires in the distribution circuit 220 also contribute to coupling. Other blocks like dividers 222 and buffers 224 may also contribute to coupling, but typically to a lesser extent.

Active blocks like buffers 224 and the mixer 230 are highly nonlinear with respect to the LO signal driving them, meaning that they will produce nonlinear intermodulation products of the LO signals. As long as the LO signals only contain a single, fundamental frequency component and associated harmonics, these nonlinear blocks will not generate any new frequency components, other than possibly additional harmonics. However, when LO signals from one LO path couple to another, and vice versa, new frequency components may arise that are highly undesired. These new components may comprise, for example, intermodulation products such as $2^{nd}$-order intermodulation products (i.e., products at the sum and difference of the LO frequencies and/or of their harmonics), $3^{rd}$-order intermodulation products (e.g., at twice one LO frequency less the other LO frequency), and so on.

It is common to use frequency dividers in an LO path, such that the frequency generated by the PLL is, for example, a factor of two or four higher than the LO signal being fed to the mixer. This may be done for any of several reasons, such as to facilitate the generation of quadrature LO components, to enable 25% duty cycle passive mixer operation, or to use harmonic rejection multi-phase mixers. However, this approach means that more frequencies may have to be considered when analyzing the various contributions to spurious components of the LO. In other words, it may not be sufficient to consider only the frequency generated by the COs in the PLLs.

Figure 3:
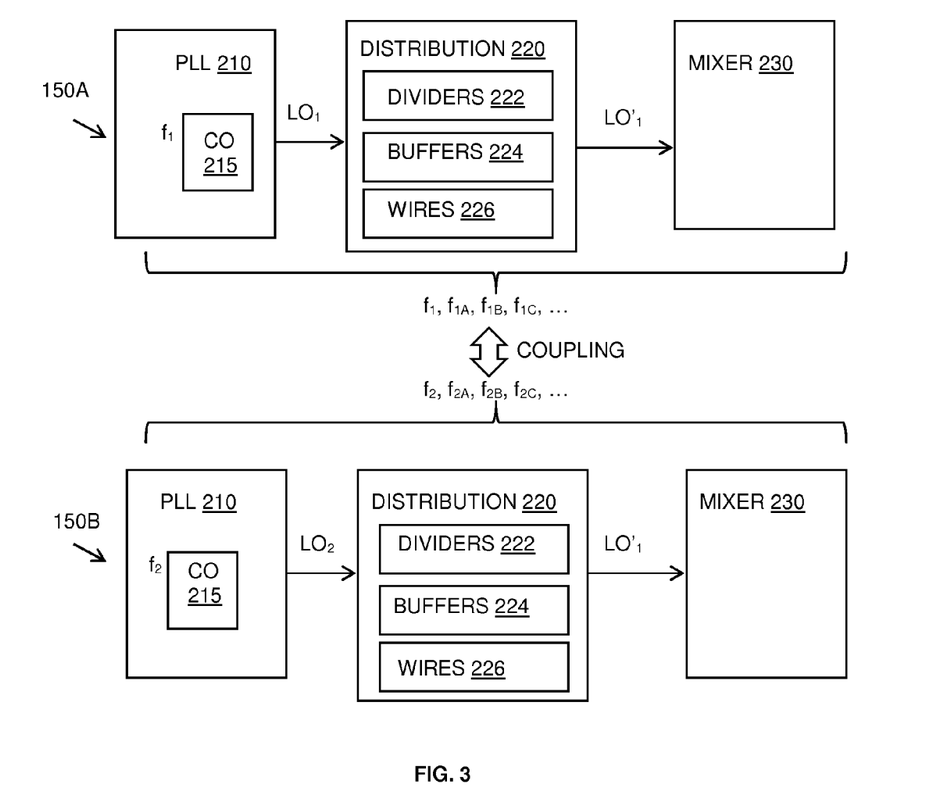
FIG. 3 illustrates coupling between a pair of LO paths.

FIG. 3 illustrates two LO paths 150A and 150B, with LO path 150A having a CO 215 generating a fundamental frequency $f_1$ and LO path 150B having a CO 215 generating a fundamental frequency $f_2$. When the distribution circuitry 220 contains frequency dividers 222, then one or more frequencies $f_{1A}$, $f_{1B}$, etc., may be generated in LO path 150A. Correspondingly, frequencies $f_{2A}$, $f_{2B}$, etc., may be generated in LO path 150B. In some cases, each divider 222 may be tightly integrated with its corresponding mixer 230, such that there is no need for long wires for distribution of the divider output signal to the mixer 230. In this case, the dominant frequency components to consider may be limited to those generated by the PLLs alone. In either case, however, the frequencies generated by the dividers and/or COs can interact with one another in the buffers 224, mixers, 230, etc., to generate a variety of nonlinear intermodulation products. As will be shown in some of the detailed examples that follow, some of these nonlinear products will sometimes appear at frequencies in relation to transmit signals such that spurious conversion of the transmit signals will interfere with the received signal or signals.

Figure 4:
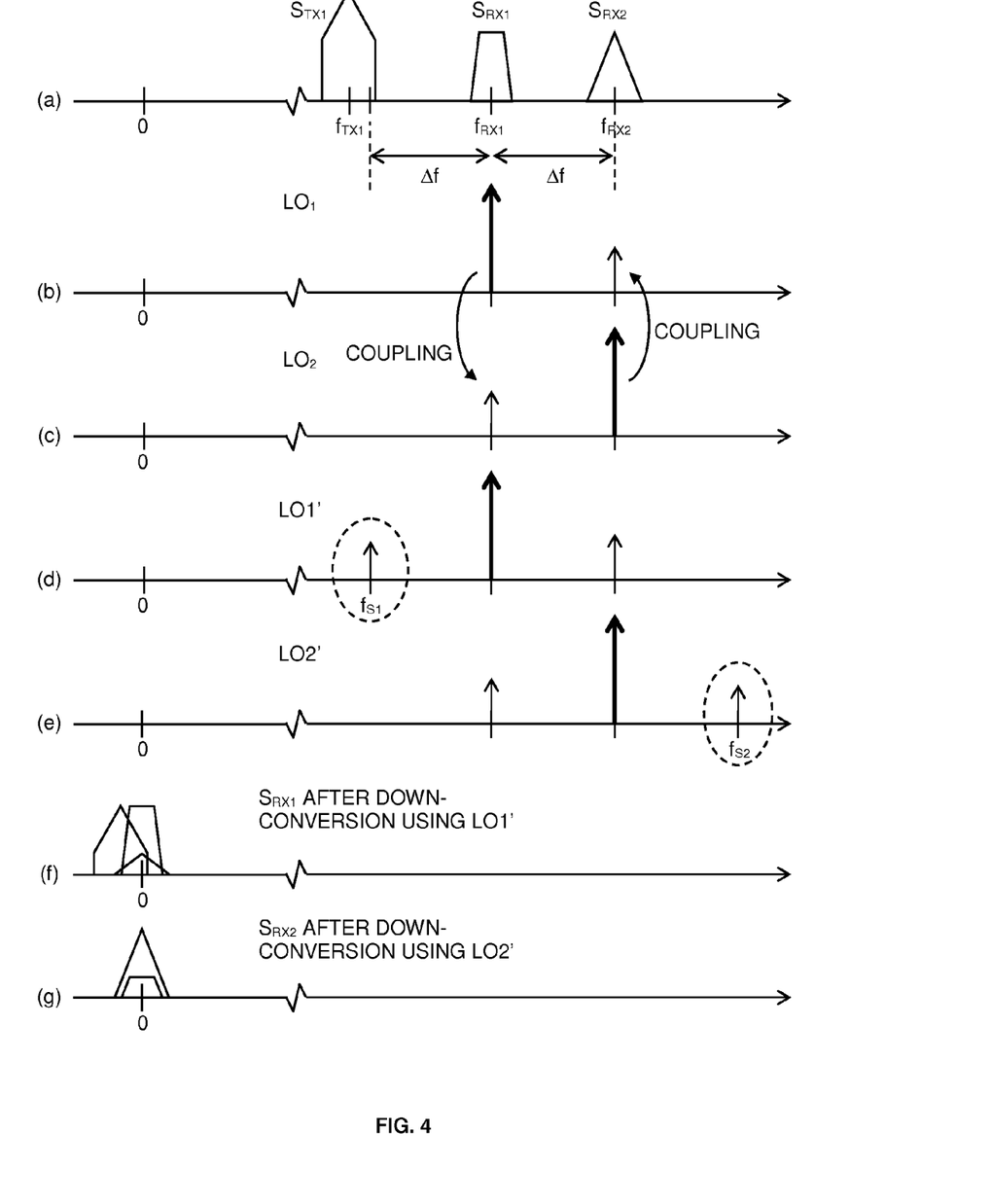
FIG. 4 shows an example of self-interference in a carrier aggregation scenario.

While the above discussion aims to provide a general description of the problem, the following examples will show one specific and major issue that can be present in a transceiver supporting intra-band carrier aggregation. FIG. 4 illustrates a first example involving a transceiver that is transmitting on a transmit frequency $f_{TX1}$ and receiving carriers at center frequencies $f_{RX1}$ and $f_{RX2}$.

FIG. 4a illustrates the spectrum where two signals SRX1 and SRX2 are to be simultaneously received and down-converted using respective receivers and LO signals, LO1 and LO2. Direct conversion is assumed in this example, so the LO signals are at the respective receive carrier frequencies $f_{RX1}$ and $f_{RX2}$. In addition to this, each receiver is also subject to a strong TX leakage signal STX1, at frequency $f_{TX1}$. Due to LO coupling, each LO signal will not only contain the desired frequency component but also a small residue of the other LO signal, as shown in FIG. 4b and FIG. 4c. When these LO signals pass through a nonlinear block, such as an LO buffer or even the mixer input itself, spurious frequency components are generated. One example is shown in FIG. 4d, which illustrates a third-order product located at frequency $f_{S1} = 2*f_{RX1} - f_{RX2}$. FIG. 4e illustrates another third-order product at frequency $f_{S2} = 2*f_{RX2} - f_{RX1}$. As a result of the coupling and the generation of the non-linear products, the LO signals that ultimately act on the received signal are composite signals, containing components at both LO frequencies and also containing one or more non-linear products. These composite LO signals are shown in FIGS. 4d and 4e, and are labeled as LO signals LO1' and LO2'.

FIGS. 4f and 4g show the results of the down-conversions in the receivers tuned to $f_{RX1}$ and $f_{RX2}$, respectively. Again, it is assumed for the purposes of this example that the receivers are direct-conversion receivers, i.e., where the LO frequency is the same as the carrier frequency. As seen in FIG. 4f, the signal $S_{RX1}$ is properly converted to a zero-frequency baseband. However, an interfering transmitter leakage component, having the same shape as transmit signal $S_{TX1}$, is also down-converted to a frequency that is very close to zero, such that the leakage component partially overlaps the down-converted receive signal. This results from the mixing of the $f_{S1}$ component of LO1', which is at a frequency that falls within the bandwidth of the transmit signal $S_{TX1}$. A replica of the second receive signal SRX2 is also down-converted to zero baseband, via the component of LO1' that is directly coupled from LO2. However, the amplitude of this replica of SRX2 is weaker than the desired receive signal, in the illustrated example, and is not as much of a problem as the interfering transmitter signal component.

FIG. 4g illustrates the results of down-conversion in the second receiver, which is tuned to $f_{RX2}$. In this case, only the replica of $S_{RX1}$ interferes with the received signal. This may or may not be a problem, depending on the relative amplitudes of the received signals and the ability of the receiver to resolve the co-channel signals.

Figure 5:
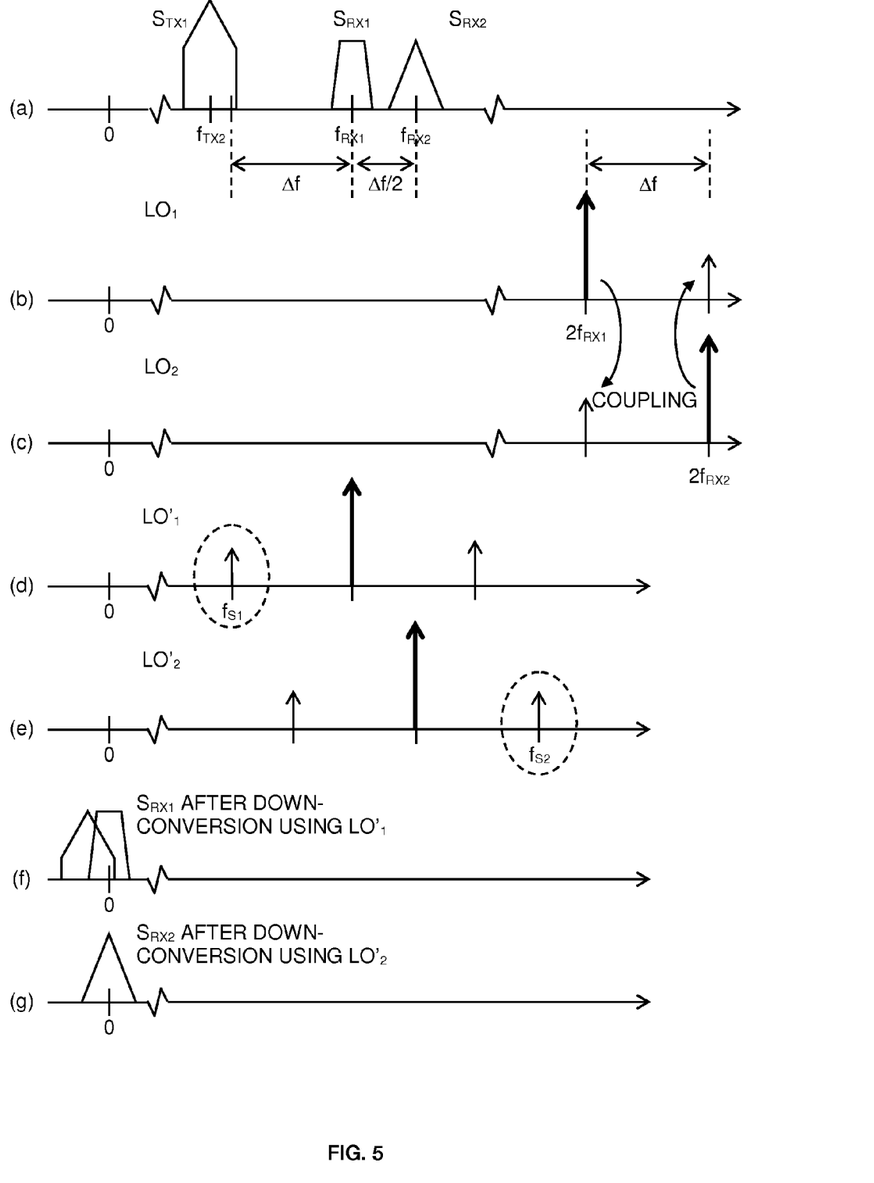
FIG. 5 shows another example of self-interference in a carrier aggregation scenario.

FIG. 5 illustrates a second example, again involving a transceiver that is transmitting on a transmit frequency $f_{TX1}$ and receiving carriers at center frequencies $f_{RX1}$ and $f_{RX2}$. In this case, however, the original LO signals LO1 and LO2 being generated each have a frequency twice that of the down-conversion frequency, i.e., $2*f_{RX1}$ and $2*f_{RX2}$. These LO signals might be fed to a frequency divider to generate the correct frequencies for down-conversion.

In addition to the received signals, each receiver in the example scenario shown in FIG. 5 is also subject to a strong TX leakage signal $S_{TX1}$. Due to LO coupling prior to the divider, each LO signal will not only contain the desired frequency component but also a small residue of the other LO signal, as shown in FIG. 5b and FIG. 5c. After the frequency divider, the LO signals will have additional frequency components, resulting from non-linear products of the LO signals and/or their harmonics. In particular, FIG. 5d illustrates a spurious product at a frequency $f_{S1} = f_{RX1} - 2*(f_{RX2} - f_{RX1})$, while FIG. 5e illustrates a spurious product at a frequency $f_{S2} = f_{RX2} + 2(f_{RX2} - f_{RX1})$. Once again, as a result of the coupling and the generation of the non-linear products, the LO signals that ultimately act on the received signal are composite signals, containing components at both LO frequencies and also containing one or more non-linear products. These composite LO signals are shown in FIGS. 5d and 5e, and are labeled as LO signals LO1' and LO2'.

FIGS. 5f and 5g show the results of the down-conversions in direct-conversion receivers tuned to $f_{RX1}$ and $f_{RX2}$, respectively. As seen in FIG. 5f, the signal $S_{RX1}$ is properly converted to a zero-frequency baseband. However, an interfering transmitter leakage component, having the same shape as transmit signal $S_{TX1}$, is again down-converted to a frequency that is very close to zero, such that the leakage component partially overlaps the down-converted receive signal. This results from the mixing of the $f_{S1}$ component of LO1', which is at a frequency that falls within the bandwidth of the transmit signal $S_{TX1}$. Likewise, FIG. 5g illustrates the results of down-conversion in the second receiver, which is tuned to $f_{RX2}$. In this receiver, there are no down-converted versions of the transmitter leakage to contend with.

Generally speaking, coupling between LO paths can be reduced by means of spatial separation on the chip, proper isolation of blocks and wires, the use of CO inductor geometries having small degrees of coupling, etc. However, all of these approaches can impose constraints on the design and/or performance of a transceiver that may not be acceptable in all cases. The techniques detailed below, which are based on the cancellation of the leaked TX signals in the digital domain, can be used to avoid these constraints.

In short, several embodiments of these techniques begin with calculating the LO spurious frequencies that are expected to arise from LO coupling and nonlinear operations on the LO signals. Together with the frequency or frequencies of any TX signals, it can be determined whether the TX signal will lead to co-channel interference or not. If so, a baseband representation of the TX signal is properly shifted in frequency, weighted and subtracted from the received signal to substantially lower the impact of the spurious signal or signals on the received signals. In several embodiments, the baseband representation of the TX signal is also subjected to a delay, to account for delays encountered by the spurious signal as it passes through transceiver components (e.g., SAW filters) and to thus properly time-align the frequency-shifted, weighted version of the TX signal with the interfering component in the receive signal.

These techniques for reducing the impact of spurious LO signals generally contain two parts. In a first part, the techniques are used to identify which transmitter carriers are "aggressors," in that they will interfere with received signals and need to be cancelled. In a second part, these aggressor transmitter carriers are canceled from the received "victim" carrier signals, at baseband.

Figure 6:
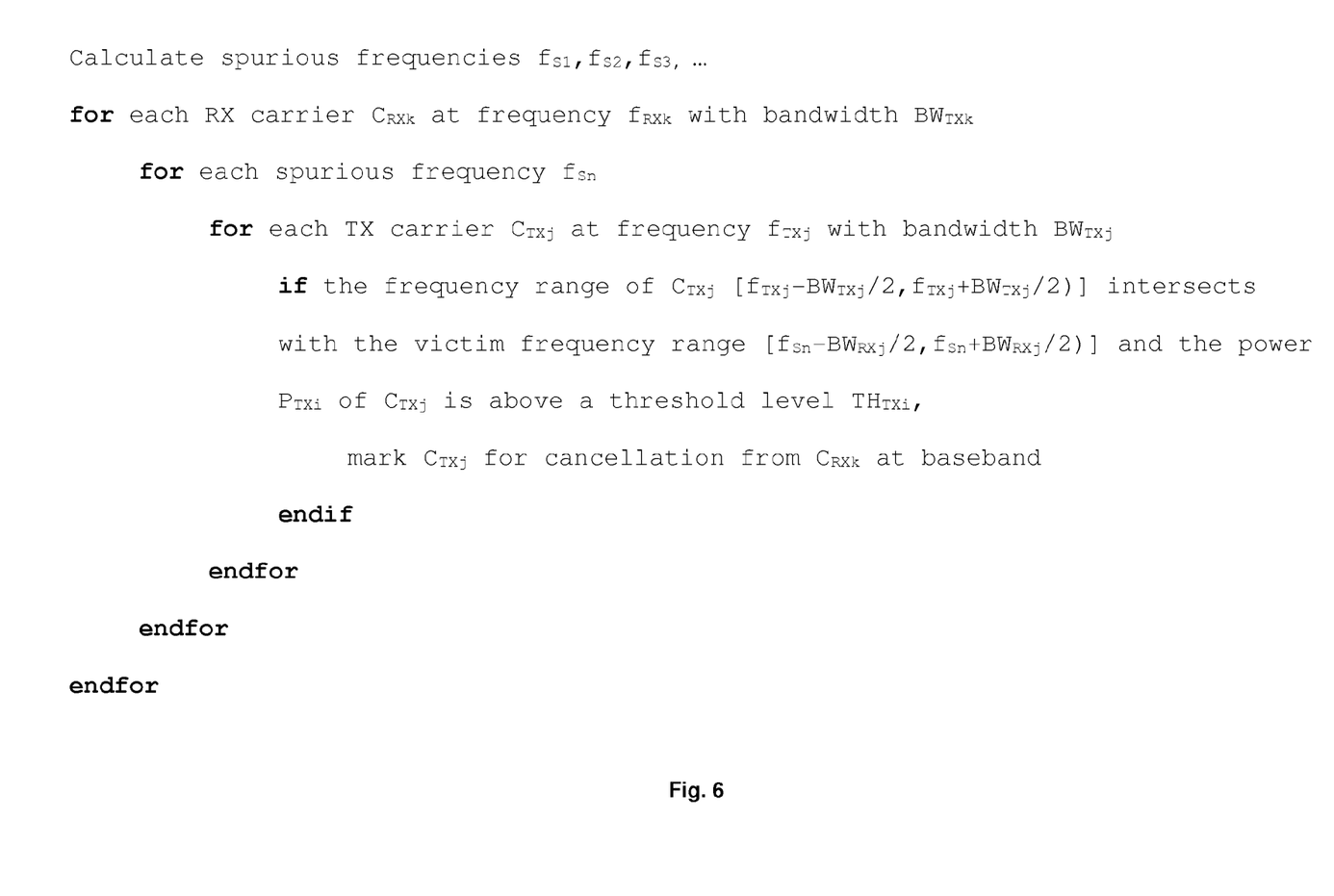
FIG. 6 illustrates pseudo-code according to an example embodiment of the presently disclosed techniques.

An example approach to the first part, identifying potential aggressor carriers, is described by the pseudo-code that is presented in FIG. 6.

As can be seen in the pseudo-code, the process begins with calculating the possible spurious frequencies that can arise as products of the LO oscillator signals, or as products of any LO frequency divider output signals. Given two LO frequencies $f_{LO1}$ and $f_{LO2}$, for example, these products include combinations of the form $a*f_{LO1} \pm b*f_{LO2}$, where a and b are integers. It will be appreciated that this formulation can be simply extended (with another term or terms) to accommodate three or more LO oscillator signals or frequency divider output signals. Those combinations that have no possibility of falling in or near a transmit frequency band need not be considered.

The non-linear products of the LO oscillator signals (or frequency divider output signals) are then compared to any TX signal frequencies. The modulated baseband bandwidths of the transmit signal and the receiver signal of interest should both be considered. If the frequency of a spurious LO product differs from the center frequency of a TX signal by less than the one-half of the sum of the TX RF signal bandwidth and the RX RF signal bandwidth, which is equivalent to the sum of the TX baseband bandwidth and the RX baseband bandwidth, then the spurious LO product can generate a co-channel response in the receiver, after down-conversion. Each potential victim received carrier signal and all combinations of spurious frequencies and transmitted carriers should thus be checked if there is an overlap of the undesired transmitter response with the frequency range of the victim received carrier. Furthermore, it should be checked whether the power level of the transmitter signal is above a threshold level such that it can be considered as a candidate aggressor. Lower power levels for the transmitter will produce less significant co-channel interference for victim received carriers, even given worst-case LO spurious levels. If the power level of the transmitter is above the threshold level, then the corresponding transmitter carriers are marked for cancellation from the victim received carriers.

The second part of the technique is the actual cancellation. This includes determining the required gain, delay, and frequency shift to be applied to a baseband signal representation of the aggressor transmitter signal that is marked for cancellation. Note that the "gain" referred to herein is generally a complex gain, having a magnitude and phase. The required frequency shift arises directly from the comparison of the spurious signal frequency to the TX signal frequency—the point of the cancellation procedure is to shift a replica of the TX signal, as represented in baseband, so that it coincides in frequency with the TX signal image that has been down-converted into the receiver band by the spurious product of the LO signals. The required complex gain and any delay is dependent on the receiver design and LO frequencies, and may vary depending on temperature. Accordingly, a calibration procedure can be used to determine the appropriate gain and delay to apply to the frequency-shifted replica of the baseband TX signal, to generate the cancellation signal. This calibration procedure may be performed during manufacturing, to generate values for various configurations to be used later during operation of the transceiver. Alternatively or additionally, a background calibration procedure that tunes the parameters in the field may be used.

Figure 7:
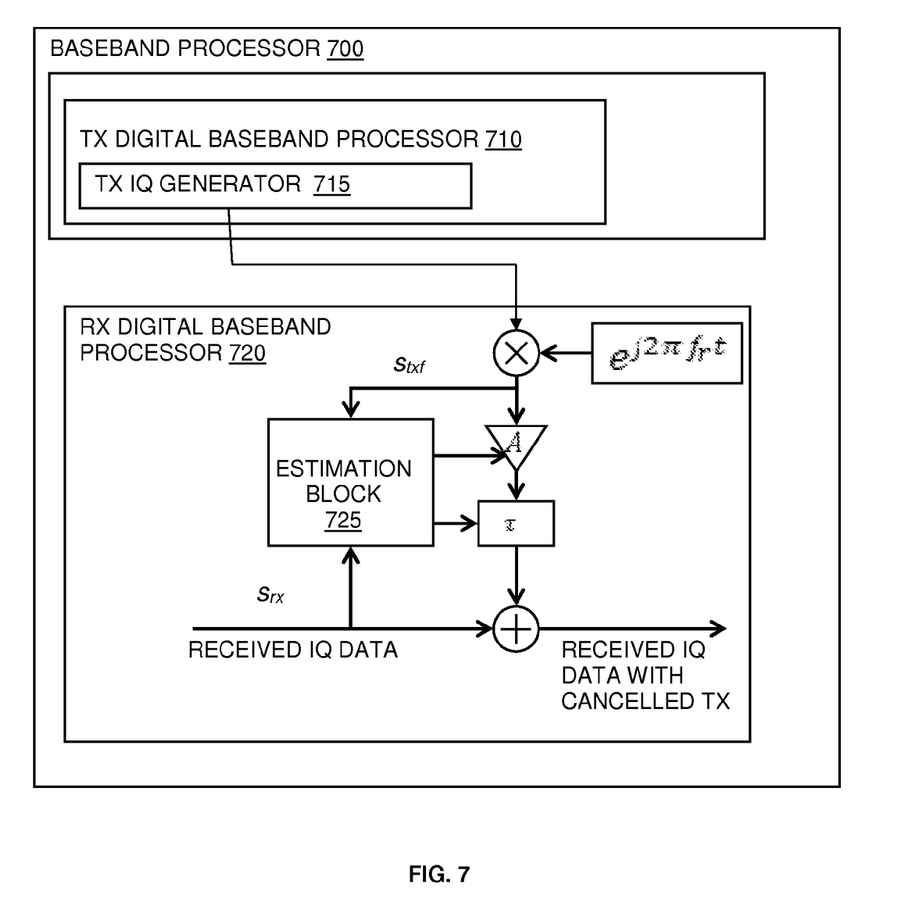
FIG. 7 is a functional representation of a baseband processor configured to carry out interference cancellation according to the techniques described herein.

The principle of the cancellation is illustrated in FIG. 7 for one aggressor transmitter and one victim receiver. FIG. 7 illustrates a baseband processor 700, which includes a TX digital baseband processor 710 and a RX digital baseband processor 720. A digital baseband representation of the TX signal, e.g., in the form of in-phase and quadrature-phase (IQ) signals from the TX IQ generator 715, is fed to the digital baseband processor 715 of the receiver. This transmitter IQ data is first shifted in frequency to align with the spurious response affecting the receiver. This is followed by applying a complex gain A to adjust the magnitude and phase of the transmitter IQ data. A delay $\tau$ is then added to match the delay that the spurious response experiences in the transceiver. Together, the frequency shift, the complex gain A, and the delay $\tau$ produce a signal that is essentially the same as the co-channel interference in the received signal, but in anti-phase, so as to cancel or attenuate the co-channel interference when combined with it in a summation unit. It is also possible to directly cancel or attenuate the co-channel interference by subtracting a TX baseband cancellation signal that is a time-delayed, amplitude and phase aligned version of TX IQ data from the received signal, given that the amplitude of the cancellation signal equals the amplitude of interference signal and the phase of the cancellation signal is the opposite of interference signal. In this case the TX IQ generator 715 and frequency down converter may be omitted.

While the frequency shift $f_r$ is known from the transmit signal carrier frequency and a calculated spurious frequency component of the receiver LO signals, the complex gain A and delay $\tau$ are provided by an estimation block 725, in the example configuration illustrated in FIG. 7. By the use of correlation techniques between the baseband representation of the received signal and the baseband representation of the transmit signal both A and $\tau$ can be determined. Such techniques are well known in the literature and are not covered here. Alternatively, the parameters can be preconfigured and used based on the transceiver configuration, e.g., with respect to carrier frequencies of transmit and receive signals, power level of transmit and receive signal.

While predetermined values may be used for the complex weight quantity A and delay $\tau$, they may in many cases be inaccurate to the extent that they have to be estimated on a regular basis or even continuously. This is particularly true for the complex weight A. The estimation block (EB) 725 in the configuration shown in FIG. 7 serves this purpose.

The frequency shifted baseband representation of the TX signal is input to the EB, as is the received (baseband) signal, for correlation purposes. The estimation of A and $\tau$ can be made using well-established correlation techniques originating from the area of acoustics using correlation techniques. Details of some of these techniques can be found, for example, in Knapp, C.; Carter, G. Clifford, "The generalized correlation method for estimation of time delay," *Acoustics, Speech and Signal Processing, IEEE Transactions on*, vol. 24, no. 4, pp. 320, 327, August 1976, as well as in Taijun Liu; Yan Ye; Xingbin Zeng; Ghannouchi, F. M., "Accurate Time-Delay Estimation and Alignment for RF Power Amplifier/Transmitter Characterization," *Circuits and Systems for Communications, 2008. ICCSC 2008. 4th IEEE International Conference on*, vol., no., pp. 70, 74, 26-28 May 2008.

Correlation is required over at least a certain amount of time to achieve a desired level of accuracy, given the fact that the spurious TX leak to be cancelled may have a level comparable to or even lower than the desired signal. Since the spurious response gain and TX delay originate from different mechanisms in the transceiver, it can be justified to handle them separately. For example, the delay $\tau$ can be estimated before the complex gain A, since an alignment in time will improve gain estimation accuracy. Furthermore, the delay may have less variation over time and frequency, whereas the spurious TX level may be very sensitive to temperature drift, etc. The estimation of the complex gain A in turn may also be carried out using correlation techniques. Example techniques are detailed in, for example, Braithwaite, R. N.; Carichner, S., "Adaptive Echo Cancellation for an On-Frequency RF Repeater using a Weighted Power Spectrum," *Wireless Technologies, 2007 European Conference on*, vol., no., pp. 82, 85, 8-10 Oct. 2007, and in Grant, S. J.; Cavers, J. K.; Goud, P. A., "A DSP controlled adaptive feedforward amplifier linearizer," *Universal Personal Communications, 1996. Record., 1996 5th IEEE International Conference on*, vol. 2, no., pp. 788, 792 vol. 2, 29 Sep.-2 Oct. 1996, as well as in Michel C. Jeruchim, Philip Balaban, K. Sam Shanmugan, Simulation of Communication Systems Modeling, Methodology and Techniques, Springer; 2nd edition (Oct. 31, 2000), ISBN-978-0306462672. Section 11.1.

To summarize, the operation of the estimation block may be as follows:
  Estimate delay between frequency-translated baseband transmit signal $s_{txf}$ and transmit signal component of received signal $s_{rx}$.
  Adjust $\tau$ to align $s_{txf}$ and $s_{rx}$ in time with respect to the transmit component.

Estimate a complex gain A to be applied on delayed $s_{tx,f}$, so as to minimize the residual transmit signal of the received signal after cancellation (subtraction).

Figure 8:
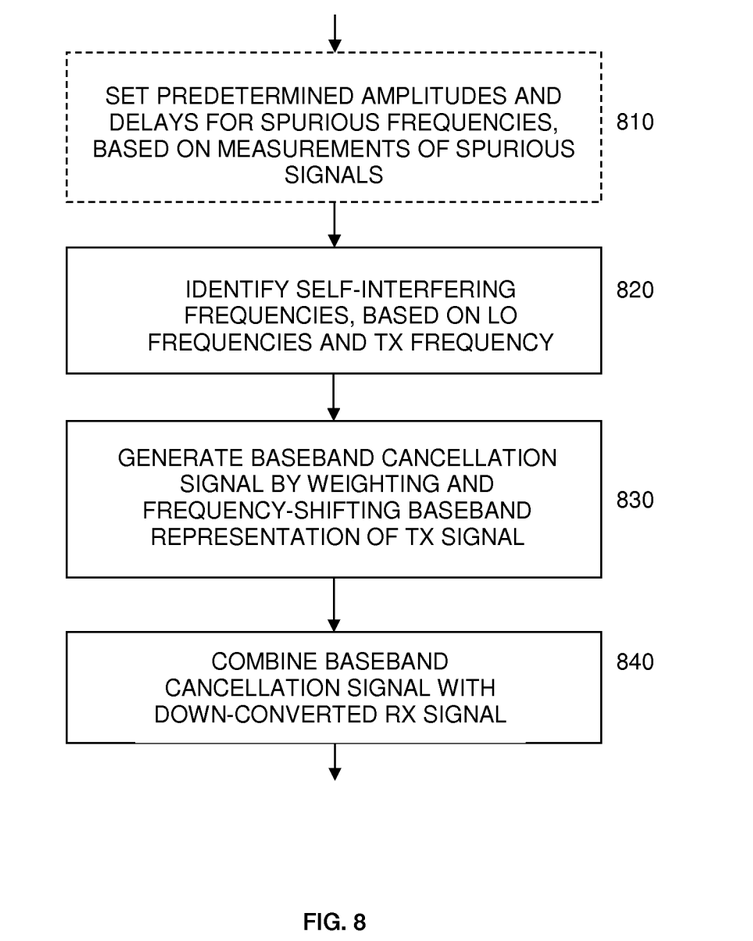
FIG. 8 is a process flow diagram illustrating an example method for interference cancellation.

FIG. 8 is a process flow diagram illustrating a generalized method for cancelling spurious signals according to the above techniques. The operations shown in FIG. 8 are suitable for implementation by a radio transceiver configured to transmit a radio-frequency transmit signal at a transmit frequency and having two or more local oscillators operative to simultaneously generate local oscillator signals, at corresponding local oscillator frequencies, for simultaneously down-converting two or more corresponding received radio-frequency signals. Such a radio transceiver might be part of a cellular telephone or other portable or end-user wireless device, for example, or part of a radio base station, relay node, or the like. The illustrated process includes only a single cancellation procedure, for a single receiver chain and a single aggressor transmitter chain; it will be appreciated that a corresponding procedure may be simultaneously carried out, as necessary, for additional receiver and/or aggressor transmitter chains in the radio transceiver.

As shown at block 810, the illustrated process begins with setting predetermined complex weights and delays corresponding to each of one or more spurious local-oscillator products. These predetermined values may be obtained, for example, through the use of correlation techniques between the baseband representation of the received signal and the baseband representation of the transmit signal. As noted above, this may be done dynamically, as part of a background calibration process in the radio transceiver. Alternatively or additionally, this may be done as a pre-calibration procedure, e.g., at the time of manufacturing. For this reason, block 810 is shown with a dashed outline, indicating that it is "optional" in the sense that it need not appear in every embodiment or in every instance that the rest of the illustrated procedure is performed.

As shown at block 820, the illustrated process includes an identifying step, in which self-interfering frequencies are identified, based on the LO oscillator signal frequencies and the TX signal frequency or frequencies. At this stage, interfering signals generated by the mixing of non-linear products of the LO oscillator signals with the TX signal or signals are marked for cancellation. This identifying step may include, for example, determining a set of spurious frequencies corresponding to nonlinear products of the local oscillator signals, comparing each of the spurious frequencies with the transmit frequency, and identifying as self-interfering frequencies those of the spurious frequencies that fall within a predetermined range of the transmit frequency. The predetermined range may be a sum of a transmit baseband bandwidth and a receive baseband bandwidth, for example. An estimated amplitude for the spurious frequencies may also be considered, e.g., such that only those spurious frequencies having an estimated amplitude exceeding a predetermined threshold are identified.

As shown at block 830, a baseband cancellation signal is then generated. This is done by frequency-shifting and weighting a baseband representation of TX signal. A delay may also be applied at this point. Note that the cancellation signal may include two or more frequency-shifted, weighted, representations of the TX signal, to cancel corresponding interfering signals. Finally, as shown at block 840, the baseband cancellation signal is combined with the down-converted RX signal. Depending on the accuracy of the weighting, frequency-shifting, and delay, the interfering signal is reduced, improving the quality of the received signal.

In some embodiments, generating the baseband cancellation signal comprises, for each of the identified spurious frequencies: frequency-shifting a digital baseband representation of the radio-frequency transmit signal to obtain a frequency-shifted baseband transmit signal, using a frequency shift based on a difference between the spurious frequency and the transmit frequency; and applying, to the frequency-shifted baseband transmit signal, a complex weight corresponding to the identified spurious frequency and a pre-determined delay, to obtain an in-phase or anti-phase cancellation signal corresponding to the identified spurious frequency.

In some embodiments, the cancellation signal for each spurious frequency is an anti-phase cancellation signal, and combining the baseband cancellation signal with a down-converted received signal comprises adding each of the anti-phase cancellation signals to the down-converted received signal. Of course, the cancellation signal in other embodiments may be an in-phase cancellation signal that is subtracted from the down-converted received signal.

In some embodiments, the complex weight and the delay are retrieved from a calibration table stored in the radio transceiver. In some embodiments, the calibration table may be built at the time of manufacture. In other embodiments, the calibration table may be built and/or updated dynamically, in the field. For instance, in some embodiments, the operation shown in block 810 of FIG. 8 may comprise setting the complex weight for each of a plurality of the nonlinear products by measuring an interfering signal component at baseband, e.g., using correlation techniques.

Figure 9:
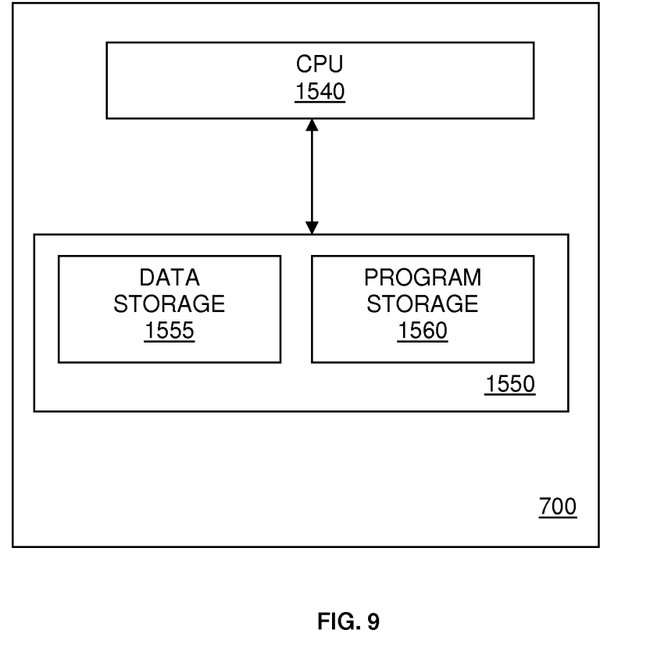
FIG. 9 illustrates details of an example baseband processing circuit.

FIG. 9 illustrates an example implementation of the baseband processor 700 that was illustrated functionally in FIG. 7. The baseband processor 700 shown in FIGS. 7 and 9 may be part of the transceiver system 110 shown in FIG. 1, for example, or may be operatively connected to a similar transceiver system. Baseband processor 700 comprises one or more processors 1540 coupled to one or more memory devices 1550 that make up a data storage memory 1555 and a program storage memory 1560. Processor 1540, identified as CPU 1540 in FIG. 15, may be a microprocessor, microcontroller, or digital signal processor, in some embodiments. More generally, processing circuit 1510 may comprise a processor/firmware combination, or specialized digital hardware, or a combination thereof. Memory 1550 may comprise one or several types of memory such as read-only memory (ROM), random-access memory, cache memory, flash memory devices, optical storage devices, etc. Because the radio transceiver that includes baseband processor 700 may support multiple radio access networks, processing circuit 1510 may include separate processing resources dedicated to one or several radio access technologies, in some embodiments. Again, because the various details and engineering tradeoffs associated with the design of baseband processing circuitry for mobile devices are well known and are unnecessary to a full understanding of the invention, additional details are not shown here.

Typical functions of the baseband processing circuit 700 include modulation and coding of transmitted signals and the demodulation and decoding of received signals. In several embodiments of the present invention, processing circuit 700 is adapted, using suitable program code stored in program storage memory 1560, for example, to carry out one of the techniques described above for reducing the effects of self-interference in a radio transceiver. Of course, it will be appreciated that not all of the steps of these techniques are necessarily performed in a single microprocessor or even in a single module.

With these and other variations and extensions in mind, those skilled in the art will appreciate that the foregoing description and the accompanying drawings represent non-limiting examples of the systems and apparatus taught herein for reducing self-interference in a radio transceiver. As such, the present invention is not limited by the foregoing description and accompanying drawings. Instead, the present invention is limited only by the following claims and their legal equivalents.

What is claimed is:

1. A method, in a radio transceiver configured to transmit a radio-frequency transmit signal at a transmit frequency and having two or more local oscillators operative to simultaneously generate local oscillator signals, at corresponding local oscillator frequencies, for simultaneously down-converting two or more corresponding received radio-frequency signals, the method comprising:
identifying one or more self-interfering frequencies, based on the local oscillator frequencies and the transmit frequency;
generating a baseband cancellation signal by weighting and frequency-shifting a baseband representation of the transmit signal, based on the identified self-interfering frequencies; and
combining the baseband cancellation signal with a down-converted received signal, to obtain an interference-reduced baseband signal;
wherein identifying the one or more self-interfering frequencies comprises:
determining a set of spurious frequencies corresponding to nonlinear products of the local oscillator signals;
comparing each of the spurious frequencies with the transmit frequency; and
identifying as self-interfering frequencies those of the spurious frequencies that fall within a predetermined range of the transmit frequency.

2. The method of claim 1, wherein said determining comprises calculating the set of spurious frequencies, based on the local oscillator frequencies.

3. The method of claim 1, wherein identifying the one or more self-interfering frequencies comprises identifying those of the spurious frequencies that fall within a predetermined range of the transmit frequency.

4. The method of claim 1, wherein the predetermined range is a sum of a transmit baseband bandwidth and a receive baseband bandwidth.

5. The method of claim 1, wherein generating the baseband cancellation signal comprises, for each of the identified spurious frequencies:
frequency-shifting a digital baseband representation of the radio-frequency transmit signal to obtain a frequency-shifted baseband transmit signal, using a frequency shift based on a difference between the spurious frequency and the transmit frequency;
applying, to the frequency-shifted baseband transmit signal, a complex weight corresponding to the identified spurious frequency and a delay, to obtain an in-phase or anti-phase cancellation signal corresponding to the identified spurious frequency.

6. The method of claim 5, wherein the cancellation signal for each spurious frequency is an anti-phase cancellation signal, and wherein combining the baseband cancellation signal with a down-converted received signal comprises adding each of the anti-phase cancellation signals to the down-converted received signal.

7. The method of claim 5, further comprising retrieving the complex weight and the delay from a calibration table stored in the radio transceiver.

8. A radio transceiver comprising:
a transmitter circuit configured to transmit a radio-frequency transmit signal at a transmit frequency;
two or more local oscillators configured to simultaneously generate local oscillator signals, at corresponding local oscillator frequencies; and
a receiver circuit configured to simultaneously down-convert two or more received radio-frequency signals, using corresponding ones of the two or more local oscillators; and
a baseband processing circuit configured to
identify one or more self-interfering frequencies, based on the local oscillator frequencies and the transmit frequency;
generate a baseband cancellation signal by weighting and frequency-shifting a baseband representation of the transmit signal; and
combine the baseband cancellation signal with a down-converted received signal, to obtain an interference-reduced baseband signal;
wherein the baseband processing circuit is configured to identify the one or more self-interfering frequencies by:
determining a set of spurious frequencies corresponding to nonlinear products of the local oscillator signals;
comparing each of the spurious frequencies with the transmit frequency; and
identifying as self-interfering frequencies those of the spurious frequencies that fall within a predetermined range of the transmit frequency.

9. The radio transceiver of claim 8, wherein the baseband processing circuit is configured to determine the set of spurious frequencies by calculating the set of spurious frequencies, based on the local oscillator frequencies.

10. The radio transceiver of claim 8, wherein the baseband processing circuit is configured to identify as self-interfering frequencies those of the spurious frequencies that fall within the predetermined range of the transmit frequency.

11. The radio transceiver of claim 8, wherein the predetermined range is a sum of a transmit baseband bandwidth and a receive baseband bandwidth.

12. The radio transceiver of claim 8, wherein the baseband processing circuit is configured to generate the baseband cancellation signal by, for each of the identified spurious frequencies:
frequency-shifting a digital baseband representation of the radio-frequency transmit signal to obtain a frequency-shifted baseband transmit signal, using a frequency shift based on a difference between the spurious frequency and the transmit frequency;
applying, to the frequency-shifted baseband transmit signal, a complex weight corresponding to the identified spurious frequency and a pre-determined delay, to obtain an in-phase or anti-phase cancellation signal corresponding to the identified spurious frequency.

13. The radio transceiver of claim 12, wherein the cancellation signal for each spurious frequency is an anti-phase cancellation signal, and wherein the baseband processor is configured to combine the baseband cancellation signal with a down-converted received signal by adding each of the anti-phase cancellation signals to the down-converted received signal.

14. The radio transceiver of claim 12, wherein the baseband processing circuit is further configured to retrieve the complex weight and the delay from a calibration table stored in the radio transceiver.

15. The radio transceiver of claim 14, wherein the baseband processing circuit is further configured to set the complex weight for each of a plurality of the nonlinear combinations by measuring spurious signals at baseband during intervals when a received signal is known to be absent from the baseband and storing a measured complex amplitude in the calibration table.

16. A wireless device comprising a radio transceiver, the radio transceiver comprising
  a transmitter circuit configured to transmit a radio-frequency transmit signal at a transmit frequency;
  two or more local oscillators configured to simultaneously generate local oscillator signals, at corresponding local oscillator frequencies; and
  a receiver circuit configured to simultaneously down-convert two or more received radio-frequency signals, using corresponding ones of the two or more local oscillators; and
  a baseband processing circuit configured to
    identify one or more self-interfering frequencies, based on the local oscillator frequencies and the transmit frequency;
    generate a baseband cancellation signal by weighting and frequency-shifting a baseband representation of the transmit signal; and
    combine the baseband cancellation signal with a down-converted received signal, to obtain an interference-reduced baseband signal;
  wherein the baseband processing circuit is configured to identify the one or more self-interfering frequencies by:
    determining a set of spurious frequencies corresponding to nonlinear products of the local oscillator signals;
    comparing each of the spurious frequencies with the transmit frequency; and
    identifying as self-interfering frequencies those of the spurious frequencies that fall within a predetermined range of the transmit frequency.

17. The wireless device of claim 16, wherein the baseband processing circuit is configured to generate the baseband cancellation signal by, for each of the identified spurious frequencies:
  frequency-shifting a digital baseband representation of the radio-frequency transmit signal to obtain a frequency-shifted baseband transmit signal, using a frequency shift based on a difference between the spurious frequency and the transmit frequency;
  applying, to the frequency-shifted baseband transmit signal, a complex weight corresponding to the identified spurious frequency and a delay, to obtain an in-phase or anti-phase cancellation signal corresponding to the identified spurious frequency.

18. The wireless device of claim 16, wherein the wireless device is one of a cellular telephone, a wireless-enabled tablet computer, a base station, and a wireless relay.

* * * * *